US012380759B2

(12) United States Patent
Milosevich

(10) Patent No.: US 12,380,759 B2
(45) Date of Patent: Aug. 5, 2025

(54) GAMING MACHINE AND METHOD WITH DYNAMIC WHEEL FEATURE

(71) Applicant: LNW Gaming, Inc., Las Vegas, NV (US)

(72) Inventor: Richard Milosevich, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 512 days.

(21) Appl. No.: 17/729,553

(22) Filed: Apr. 26, 2022

(65) Prior Publication Data

US 2023/0343168 A1 Oct. 26, 2023

(51) Int. Cl.
*G07F 17/32* (2006.01)
*G07F 17/34* (2006.01)

(52) U.S. Cl.
CPC ...... *G07F 17/3213* (2013.01); *G07F 17/3262* (2013.01); *G07F 17/3267* (2013.01); *G07F 17/34* (2013.01)

(58) Field of Classification Search
CPC ............. G07F 17/3213; G07F 17/3262; G07F 17/3267; G07F 17/34
See application file for complete search history.

(56) References Cited

U.S. PATENT DOCUMENTS

| | | | | |
|---|---|---|---|---|
| 6,517,433 | B2 * | 2/2003 | Loose | G07F 17/34 463/20 |
| 6,533,273 | B2 * | 3/2003 | Cole | G07F 17/3244 463/20 |
| 6,726,563 | B1 * | 4/2004 | Baerlocher | G07F 17/3269 463/20 |
| 7,226,357 | B2 | 6/2007 | Vancura | |
| 7,229,350 | B2 | 6/2007 | Baerlocher et al. | |
| 8,052,148 | B1 | 11/2011 | Kelly et al. | |
| 8,057,303 | B2 * | 11/2011 | Rasmussen | G07F 17/3202 463/16 |
| 8,226,459 | B2 * | 7/2012 | Barrett | G07F 17/32 463/7 |
| 8,628,403 | B2 | 1/2014 | Cole et al. | |
| 9,082,259 | B2 | 7/2015 | Luciano, Jr. et al. | |
| 9,251,667 | B2 * | 2/2016 | Marks | G07F 17/3262 |
| 9,401,064 | B2 | 7/2016 | Young | |
| 11,978,301 | B2 * | 5/2024 | Peterson | G07F 17/323 |

(Continued)

*Primary Examiner* — William H McCulloch, Jr.

(57) ABSTRACT

A gaming system includes game-logic circuitry and a presentation assembly that presents a plurality of symbol positions divided between a plurality of position subsets and at least one segmented award element associated with one or more position subset and including a plurality of award segments having award values. The game-logic circuitry causes the presentation assembly to: (i) present one or more game outcomes by populating the symbol positions with randomly selected symbols, (ii) in response to a first position subset being populated by a first value-bearing symbol, update one or more award segments of a first segmented award element associated with the first subset at least partially as a function of an award value of the first value-bearing symbol, (iii) in response to an award trigger event, select an award segment of the first segmented award element, and (iv) provide an award for the selected award segment.

21 Claims, 7 Drawing Sheets

(56) References Cited

U.S. PATENT DOCUMENTS

| | | | | |
|---|---|---|---|---|
| 2006/0025201 | A1* | 2/2006 | Van Asdale | G07F 17/32 463/20 |
| 2007/0129135 | A1* | 6/2007 | Marks | G07F 17/3262 463/20 |
| 2008/0113727 | A1 | 5/2008 | Vallejo et al. | |
| 2012/0077566 | A1 | 3/2012 | Schultz et al. | |
| 2014/0135096 | A1 | 5/2014 | Aida et al. | |
| 2015/0287269 | A1* | 10/2015 | Berman | G07F 17/326 463/20 |
| 2019/0122488 | A1* | 4/2019 | Berman | G07F 17/32 |
| 2020/0090467 | A1* | 3/2020 | Marks | G07F 17/3225 |
| 2021/0104125 | A1 | 4/2021 | You et al. | |
| 2021/0279999 | A1* | 9/2021 | Meyer | G07F 17/3267 |
| 2023/0343168 | A1* | 10/2023 | Milosevich | G07F 17/3267 |

* cited by examiner

GAMING MACHINE AND METHOD WITH DYNAMIC WHEEL FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, gaming machines, and methods and, more particularly, to new and improved animations and/or game elements in connection with a dynamic wheel feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to one aspect of the present disclosure, a gaming system includes game-logic circuitry and a presentation assembly that presents a plurality of symbol positions divided between a plurality of position subsets and at least one segmented award element, wherein each of the at least one segmented award element is associated with a respective position subset and includes a plurality of award segments having award indicia that visually indicate corresponding award values. The game-logic circuitry causes the presentation assembly to: (i) present one or more game outcomes by populating the plurality of symbol positions with randomly selected symbols, (ii) in response to a first position subset being populated by a first value-bearing symbol, update one or more award segments of a first segmented award element associated with the first subset at least partially as a function of an award value visually indicated by the first value-bearing symbol, (iii) in response to an award trigger event associated with the first segmented award element, select an award segment of the first segmented award element, and (iv) provide an award for the award value corresponding to the selected award segment. The gaming system may be wholly or partially implemented in a gaming machine, such as those described herein.

According to another aspect of the present disclosure, a method of conducting and presenting a game using a gaming system is provided. The gaming system includes game-logic circuitry and a gaming machine with a presentation assembly. The method includes presenting, by the presentation assembly, a plurality of symbol positions divided between a plurality of position subsets and at least one segmented award element, wherein each of the at least one segmented award element is associated with a respective position subset and includes a plurality of award segments having award indicia that visually indicate corresponding award values. The method further includes the game-logic circuitry causing the presentation assembly to: (i) present one or more game outcomes by populating the plurality of symbol positions with randomly selected symbols, (ii) in response to a first position subset being populated by a first value-bearing symbol, update one or more award segments of a first segmented award element associated with the first subset at least partially as a function of an award value visually indicated by the first value-bearing symbol, (iii) in response to an award trigger event associated with the first segmented award element, select an award segment of the first segmented award element, and (iv) provide an award for the award value corresponding to the selected award segment.

Additional aspects of the present disclosure will be apparent to those of ordinary skill in the art in view of the detailed description of various embodiments, which is made with reference to the drawings, a brief description of which is provided below.

Figure 1:
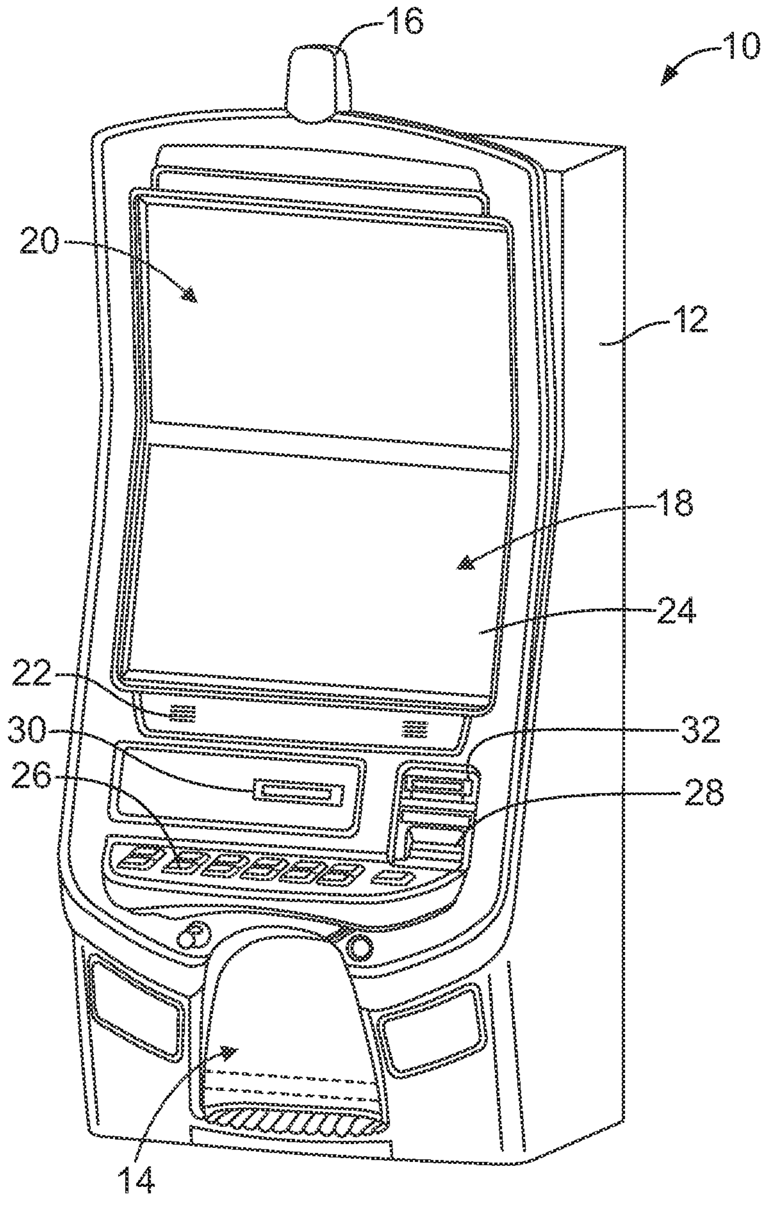
FIG. 1 is a perspective view of a free-standing gaming machine according to one or more embodiments of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

The gaming systems and methods described herein provide game features with award wheels. The award wheels are segmented to include a plurality of awards such that triggering an award wheel feature causes the systems described herein to select an award from the corresponding plurality of awards. The award wheels are dynamically updated in response to game events and/or conditions. For example, value-bearing symbols occupying symbol positions associated with a given award wheel may cause one or more awards associated with the wheel to be replaced or otherwise updated based at least in part on the values borne by the value-bearing symbols. Unique animations and presentation elements as described herein enable the gaming systems and methods below to provide functionality that would be unavailable through conventional or well-known gaming systems.

Embodiments of the present invention comprise an innovative application of data processing steps that, when implemented by game-logic circuitry, direct presentation assembly to present a symbol-value collection and award process that minimizes processing overhead by utilizing numbered indicia to represent credit values instead of complex, fanciful game images. Further, the process awards and/or modifies displayed values borne by special game elements (i.e., segmented award wheels) according to stored, variable criteria. In this way, the award wheels and associated value-bearing symbols provide building blocks for innumerable different collection and/or modification sequences simply by manipulating the criteria associated with the award wheels and/or the value-bearing symbols, resulting in fewer rules needed for the collection and award process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-collection process that can be easily adapted to any theme/brand while remaining easily understood by players.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIGS. 4-7). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIGS. 4-7), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
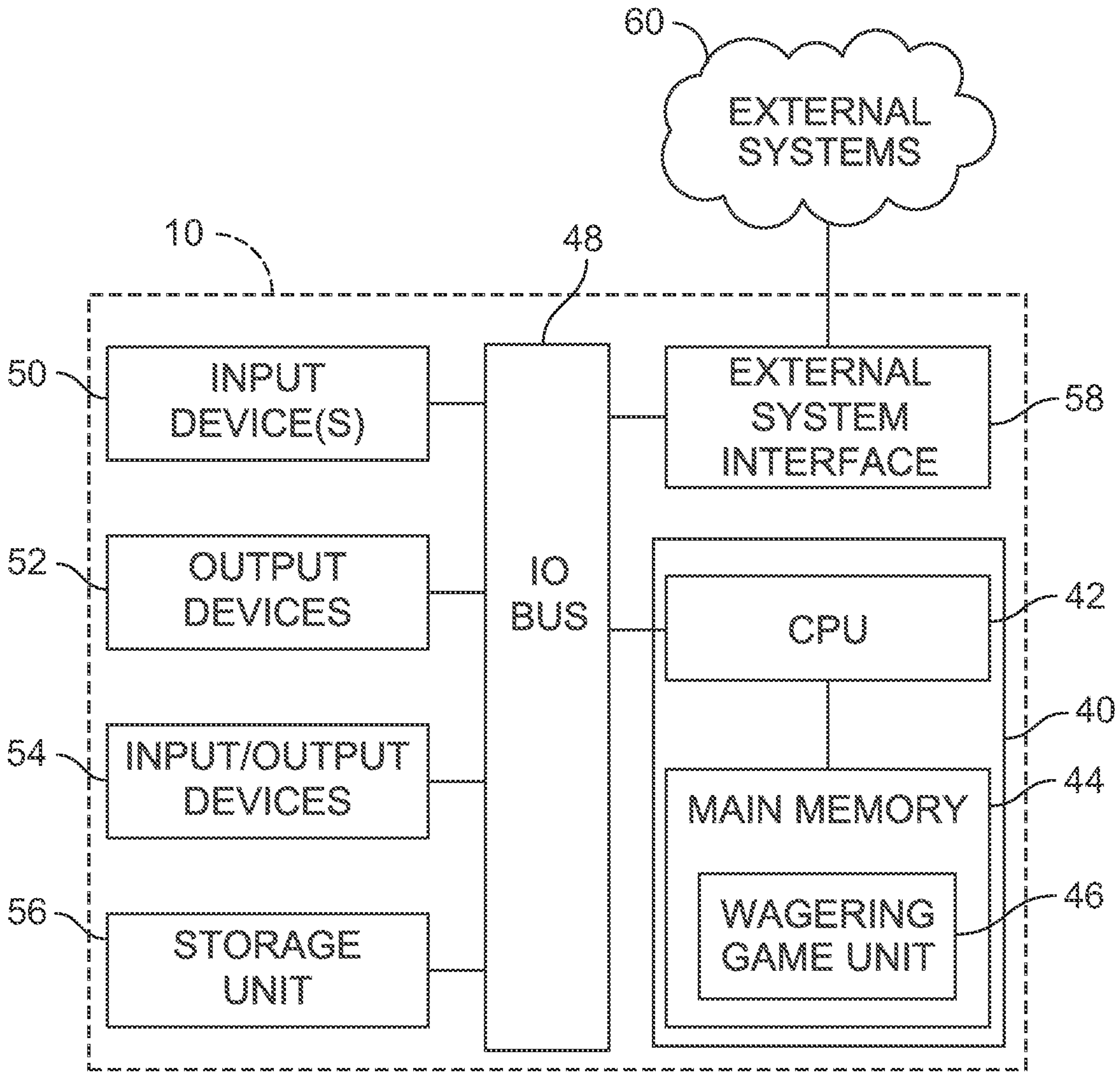
FIG. 2 is a schematic view of a gaming system according to one or more embodiments of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A. 5:12-23, 5:12-45, and all other relevant provisions of the New Jersey Casino Control Act. As can be seen from the description herein, the gaming machine 10 may be implemented with hardware and software architectures, circuitry, and other special features that differentiate it from general-purpose computers (e.g., desktop PCs, laptops, and tablets).

Figure 3:
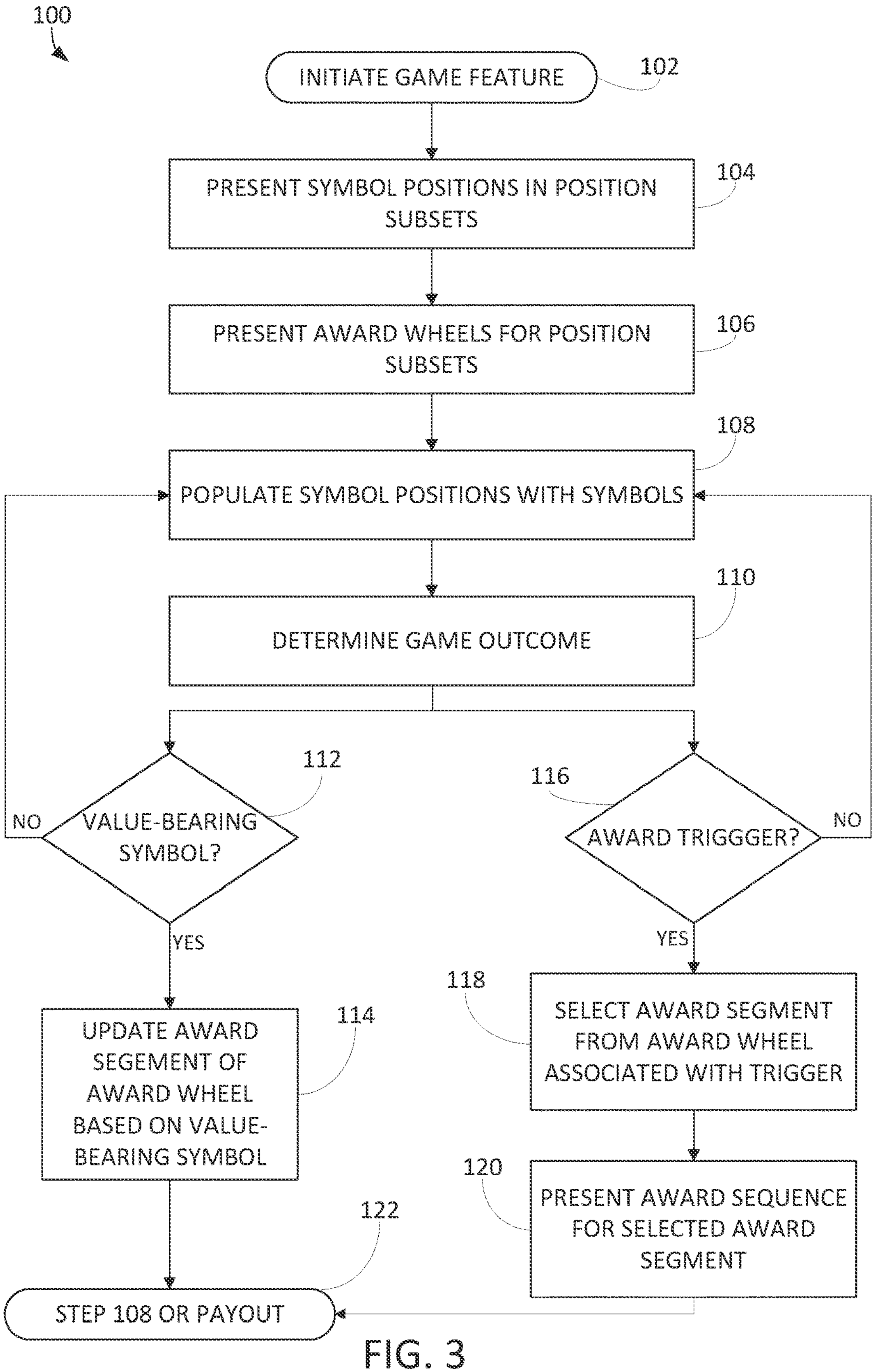
FIG. 3 is a flowchart for a data processing method that corresponds to instructions executed by a controller, according to one or more embodiments of the present invention.

Referring now to FIG. 3, there is shown a flowchart representing one data processing method 100 corresponding to at least some instructions stored and executed by the game-logic circuitry 40 in FIG. 2 to perform operations according to an embodiment of the present invention. The game-logic circuitry is in communication with one or more presentation assemblies to present the corresponding game elements and animations described herein. One example presentation assembly includes one or more graphical displays that generate and present graphical interfaces with the game elements described herein. In another example, the presentation assembly includes mechanical game elements (which may, in some embodiments, be used in combination with graphical displays) that are configured move, adjust, or otherwise alter their respective states in response to commands provided by the game-logic circuitry. In other embodiments, the method 100 includes additional, fewer, or alternative steps and/or is performed by one or more additional or alternative devices, including those described elsewhere herein.

At step 102, a game feature of a game is initiated. For a base or default game feature, the game feature is initiated in response to a player initiating a gaming session. The gaming session may be initiated at a gaming machine or another suitable device. For wagering games, initiating the gaming session includes establishing a credit balance for play of the wagering game. The player provides credits to the gaming machine through one or more physical credit inputs (e.g., bills, coins, tickets, cards, etc.) manually provided to one or more credit input devices associated with the gaming machine. Additionally or alternatively, credits may be provided by linking an account or wallet of the player to the gaming machine for the gaming session. The linking process may include, for example, the player providing login credentials at the gaming machine or a player computing device (e.g., a smartphone) or establishing communication between the gaming machine and the player computing device (e.g., through a QR code, wireless communication, etc.). The player computing device may be previously established as an authorized device of the player, thereby enabling funds or credits to be released for the gaming session.

In response to the received credit input, the game-logic circuitry (or another accounting device associated with the gaming machine) establishes a credit balance, where the credit balance is dynamically adjusted in response to subsequent play of the wagering game. That is, wagers are decremented from the credit balance, and awards are added to the credit balance. The gaming session can remain active as long as sufficient credits remain in the credit balance to fund a wager. Additional credits may be provided during the gaming session through the means described above and the awards provided through play of the game. In response to establishing the credit balance, play of the game feature as described herein is performed.

In certain embodiments, the credit balance may not be associated with a monetary value, or the game may be played without credit-based wagering. In such embodiments, the credits may have an alternative value (e.g., value in a casual video game or digital storefront selling goods without monetary value) and/or may be used to regulate the duration of the gaming session. For example, the credit balance may instead be a store of time value rather than credits, where the balance indicates the remaining duration of the gaming session. Other suitable forms of the game features described herein beyond wager-based embodiments are contemplated as within the spirit and scope of the present disclosure.

In some embodiments, the game feature described herein is a bonus game feature (or other suitable game feature beyond the base game feature). That is, the bonus game feature is initiated in response to one or more events or conditions associated with the gaming session. In one example, the bonus game feature is initiated in response to certain symbols or game outcomes of the base game feature. In another example, the bonus game feature is triggered in response to the player achieving threshold values of play time, wager amount, wager frequency, and/or number of winning outcomes. The bonus game feature may continue until a termination condition is met, such as a predetermined number of game outcomes expiring. In certain embodiments, the games described herein include both a base game feature and bonus game feature sharing similar or the game functionality. In such embodiments, the bonus game feature may include enhanced awards, enhanced probabilities of achieving certain awards, and/or additional features not present in the base game feature. Although the embodiment described herein with respect to FIG. 4 is a base game feature, it is to be understood that the details provided herein are applicable to the bonus game feature embodiments of the present disclosure.

To conduct the game feature, the presentation assembly is configured to present a game interface for the game feature. At step 104, the game-logic circuitry causes the presentation assembly to present a plurality of symbol positions. More specifically, the plurality of symbol positions is grouped into a plurality of position subsets. Each position subset includes at least one symbol position. In at least some embodiments, the position subsets include the same number of symbol positions. The symbol positions may be uniquely associated with one position subset or associated with more than symbol position. Association between a position subset and a symbol position may be visually indicated to the player through one or more visual indicators (e.g., a background color or indicia applied to the symbol position), the location of the symbol position on the game interface, emotive lighting provided by a lighting assembly of the presentation assembly, and/or other suitable indication conveyed to the player.

In the example embodiment, the position subsets are arranged together to form a single symbol array. The symbol array includes a plurality of rows and columns of symbol positions, which may be used to determine winning outcomes and/or other aspects of the game feature as described herein. The number of rows and/or columns of the array may be adjusted to any suitable number for the particular configuration of the game feature. In one example, the array includes three rows and five columns. In another example, the array includes five rows and five columns. The symbol array is not limited to square or rectangle arrays where each row and column includes the same number of symbol positions. For example, the first three columns of an array may include four symbol positions, while the fourth column includes six positions, and the fifth column includes eight positions. The array may be static through the game feature or dynamic such that symbol positions may be added or removed from the array based on events or conditions of the game feature. In the example embodiment, each position subset represents a column of the symbol array. In other embodiments, each position subset represents a row of the symbol array.

In certain embodiments, the symbol positions are not grouped together into a single symbol array, but rather are divided. In one example, the symbol positions are divided into a plurality of discrete subarrays (e.g., three subarrays). In another example, each position subset is isolated from other position subsets. Although the example embodiment described herein includes a single symbol array, it is to be understood that the functionality and presentation of the method 100 is applicable and adjustable to embodiments with other suitable means of presenting the position subsets of symbol positions.

At step 106, the presentation assembly presents award wheels for the position subsets. The award wheels are segmented wheels that include a plurality of awards. Each award is linked to a segment of the award wheel such that selection of a particular segment or wedge of the wheel as described herein causes the corresponding award to be provided. In some embodiments, each position subset is associated with a respective award wheel. In other embodiments, a position subset is linked to multiple award wheels, and/or an award wheel is linked to multiple position subsets. The link between an award wheel and a position subset may be visually conveyed to the player through one or more visual indicators (e.g., text or a shared background color) and/or the position of the award wheel relative to the position subset. For example, in the example embodiment where position subsets are columns of the array, the award wheels may be positioned to align above or below the corresponding column (see FIG. 4A as an example described in detail herein). In certain embodiments, the associated between position subsets and award wheels may be dynamic such that game events and/or conditions alter which award wheel is associated with a particular position subset.

In some embodiments, the award wheels are initiated with a set of initial award values. Each initial award value is assigned to a respective segment of the award wheel. The initial award values may be predetermined, randomly selected from a range or set of available values or based on conditions or events of the gaming session (including historical data from previous gaming sessions of the player). The set of initial award values may be equal to or less than the number of segments of the award wheel. That is, in certain embodiments, some of the segments are not associated with an award value initially, but rather may be occupied through game events described herein. In other embodiments, the award wheel is initiated with no initial award values.

The award values of the award wheel may be visually indicated through indicia presented on the corresponding segment of the award wheel. The indicia may be presented throughout play of the game or may be hidden until a particular game event occurs. In one example, triggering a selection process causes the indicia to be revealed. In another example, selection of a particular segment causes the indicia to be revealed. The indicia may include text and/or other visual indicators that convey the value of the corresponding award value.

In at least some embodiments, the awards of an award wheel are not limited to fixed award values. Rather, other suitable awards, such as bonus game triggers, free spins, multipliers, jackpot awards, and the like may be presented in addition to or in place of the award values described herein. In certain embodiments, a segment of an award wheel may include a plurality of awards, such as an award value and a trigger for a bonus game feature. In other embodiments, one or more additional award wheels may be provided beyond the award wheels assigned to a particular position subset such that the additional award wheels provide additional or alternative awards. For example, the additional award wheels may be provided in a bonus game feature to select and apply multipliers to award values of the award wheel.

Although the embodiments described herein include award wheels, it is to be understood that the present disclosure is not limited to wheels to provide the functionality described herein. That is, other suitable segmented award elements, such as reel strips, other segmented geometrical elements (e.g., a square or octahedron), and the like, can be used with the functionality described herein with respect to award wheels. These segmented award elements are configured to be presented and animated to convey the dynamic changes and segment selection described herein based on the particular form of the segmented award elements.

Following step 106, the game interface of the game feature is presented, and play of the game feature is initiated. Initiating play of the game includes, for wager-based games, the player providing a wager from the credit balance. In response to the wager, the game-logic circuitry causes the presentation assembly to present a game cycle outcome generated by the game-logic circuitry. The game-logic circuitry generates the game cycle outcome before, after, or during the reception of the wager. It is to be understood generation of the game cycle outcomes by the game-logic circuitry may occur at any suitable time prior to or during the gaming session to facilitate improved computing resource allocation, abide by regulatory requirements, and the like. For example, the game-logic circuitry may generate a plurality of game cycle outcomes together as a batch. In another example, the game-logic circuitry generates the game cycle outcome in response to player input (e.g., a wager) for each outcome.

In the example embodiment, a game cycle outcome includes the game-logic circuitry randomly selecting symbols to populate (or partially populate) the symbol positions of the array. The randomly selected symbols may be selected from one or more sets of available symbols. For example, the game-logic circuitry selects symbols from a plurality of symbol-bearing reel strips associated with the symbol positions. Each reel strip is associated with one or more symbol positions such that the selected symbols from the strips are presented within the associated symbol positions. In one example, each reel strip is associated with a column of the symbol array.

At step 108, the presentation assembly is configured to present the game cycle outcome by populating the symbol positions with the randomly selected symbols. The population of the symbol positions include one or more animations to indicate to the player that a new game cycle outcome is being presented. Presentation of the outcome may include one or more animations of the reel strips "spinning" or other means of cycling available symbols through the symbol array. Such animations are configured to stop with the outcome symbols populating the array, thereby enabling the player to visually inspect the game outcome.

At step 110, the game-logic circuitry determines the game outcome by detecting any game events, winning outcomes, and the like from the randomly selected symbols. Winning outcomes may include, for example, line pays, scatter pays, and/or other suitable forms of winning outcomes. The presentation assembly is configured to present award sequences for the winning outcomes to apply the associated awards to the gaming session (e.g., triggering a bonus game feature, adding free spins, applying multipliers, awarding credit values to the credit balance, etc.). An award sequence may include, for example, animations, graphical elements, emotive lighting, audio, vibration, control sequences for moving mechanical game elements, and the like that engage the player and/or other observers and indicate the presence (and identity) of the winning outcome. Award sequences may be separate for each winning outcome or combined together such that awards for multiple winning outcomes are presented as a single award sequence.

In the example embodiment, in addition to detecting winning outcomes at step 110, the game-logic circuitry also detects the presence of value-bearing symbols and award triggers at steps 112 and 116, respectively, as described herein. The determinations at steps 112 and 116 are shown to occur in parallel with one another in FIG. 3. However, it is to be understood that the game-logic circuitry may include instructions or rules that process the determinations 112, 116 sequentially. For example, in one embodiment, the game-logic circuitry performs steps 112 and 114 prior to the determination at step 116.

At step 112, the game-logic circuitry determines whether or not the randomly selected symbols populating the symbol array include any value-bearing symbols. A value-bearing symbol includes award indicia that visually indicates an award value associated with the value-bearing symbol. The award value of a value-bearing symbol may be predetermined (e.g., the value-bearing symbols selected by the game-logic circuitry already have an award value prior to selection), or the award value may be dynamic. The dynamic award value may be selected from a range of available award values or a set of available award values at least partially at random (i.e., game events or conditions, such that the wager amount of the player, may affect the random selection). If no value-bearing symbol is detected, the method 100 continues to the next game cycle outcome or, in some embodiments, to step 116.

If, however, a value-bearing symbol is detected at step 112, the game-logic circuitry causes the presentation assembly to update at least one segment of one or more award wheels based on the award value indicated by the value-bearing symbol. In the example embodiment, the award wheel associated with the position subset occupied by the detected value-bearing symbol is updated. In other embodiments, additional or alternative award wheels linked to the value-bearing symbol and/or the symbol position occupied by the symbol are updated.

In at least some embodiments, the award value of the value-bearing symbol replaces the award value of one or more award segments of the award wheel, which may include award segments with no previous value. In the example embodiment, the award value replaces the award value of one award segment. The selection of an award segment from the plurality of segments of the award wheel to update the corresponding award value may be random, partially random, based on a set of predetermined rules, and/or in response to player input. In one example of rules-based selection, segments with award values greater than the award value of the value-bearing symbol are removed from selection such that the award value of the value-bearing symbol is greater than or equal to the replaced award value. In another example, the award values of the segments may be classified into different ranges of value (e.g., low value, medium value, high value, jackpot, etc.), and the award value of the value-bearing symbol can only replace the award values in the same or lower value ranges.

Additionally or alternatively, the award value of the value-bearing symbol does not directly replace the award value of an award segment. Rather, the award value may be modified based on additional game events or conditions (e.g., a modifier symbol is present in the symbol array), aggregated with one or more other values, such as the initial award value of the award segment, and/or other suitable logical and/or mathematical operations incorporating the award value of the value-bearing symbol are applied to generate a new or modified value. For embodiments in which multiple operations are available, one or more game events or conditions are used to determine which operation is to be performed. In one example, different types of value-bearing symbols are associated with different operations to modify, replace, or update the award values of one or more award wheels. In another example, additional wheels (which may sometimes be referred to as “modifier wheels”) or other suitable game elements are configured to select a modifier that is applied to the award value of the value-bearing symbol.

The dynamic selection and update processes associated with the award wheels and value-bearing symbols are conveyed to the player at least through one or more animations and/or the game elements being updated (e.g., the indicia of the selected award segment updating to present the new award value). The animations may be predetermined animations stored by the game-logic circuitry or may be generated by the game-logic circuitry based on predetermined rules and stored data. For example, certain animations are defined by a set of instructions and data that the game-logic circuitry applies to a current state (e.g., the location of the game elements on the interface and/or the current award indicia) to the game interface to generate the corresponding animation.

In the example embodiment, the game-logic circuitry also determines if an award trigger is present in the game outcome at step 116. The award trigger is a game event, condition, or combinations thereof that initiate an award sequence associated with the award wheels as described here. Similar to the value-bearing symbols, award triggers may be associated with one or more of the award wheels such that the corresponding award sequence is triggered for the associated award wheels only. Some award triggers may trigger award sequences for all of the award wheels. In the example embodiment, the award trigger is the presence of a trigger symbol in a symbol position of the symbol array. The trigger symbols may be dedicated symbols that only serve the purpose of triggering an award sequence or have additional functionality, such as functioning as a value-bearing symbol or as a general symbol used for determining winning outcomes. In certain embodiments, additional trigger symbols are required to trigger the award sequence. For example, three or more trigger symbols occupying the symbol array or a particular position subset may be required. These trigger symbols may be required to land during one game outcome, or the symbols may be collected through a plurality of outcomes. In other embodiments, other suitable game elements, events, and/or conditions may be used in addition to or instead of the trigger symbols to initiate an award sequence.

If an award trigger is detected at step 116, the game-logic circuitry is configured to select an award segment from each award wheel associated with the award trigger at step 118. Selection of the award segment may be random, partially random, based on one or more game events or triggers, based on user input, and/or the like. In embodiments with random selection, one or more random numbers or other random determinators are generated (i.e., by the random number generator) and compared to the award segments to determine the selection. In one example, an award table is stored by the game-logic circuitry that includes each award segment and one or more corresponding unique values. In such an example, the randomly-generated value is compared to the associated values, and the award segment associated with the value matching the randomly-generated value is selected. In certain embodiments, selection of the award segments may be weighted such that one award segment is more likely to be selected relative to another award segment. For example, the table described above may be weighted by assigning more or less values to a particular award segment. The weighting may be random, based on the award values of the segments, manually assigned by the player, and/or other suitable factors associated with the game feature. The weighting may be visually conveyed to the player by changing the relative visual size of the award segments. The relative visual size of the award segments matches the probability of selection or is not directly representative of the underlying selection probabilities. In one example, the sizes of the award segments are scaled to generally match the relative probabilities of selection but require each award segment by large enough to fit the award indicia at a legible font. In another example, the award segments are not scaled, but rather may include other visual characteristics to depict the relative probabilities, such as the color of the segments or other graphical elements applied to or near the award segments.

The selection process is depicted to the player through a selection sequence. The selection sequence may be a subsequence of an award sequence presented by the gaming machine. The selection sequence may include visual, audio, tactile, and/or other sensory elements to engage the player and indicate which award segment was selected. In at least some embodiments, the selection process includes the presentation assembly of the gaming machine presenting an animation (and/or initiate mechanical equivalent movement) of the selection. In one example, the award wheel includes a selection indicator, and the award wheel spins and stops after a period of time. In such an example, the selected award segment is identified by the selection indicator after the award wheel has stopped. In another example, the award wheel remains fixed, and the selection indicator spins and stops to identify the selected award segment. Other suitable animations, which may include variations of the two examples provided above, may be provided to indicate the selection to the player. For example, the award wheels may spin throughout play of the game feature and stop to add new award values (i.e., step 114) or to present the selection sequence. In another example, the award wheels may expand within the game interface through the selection sequence to enable the player to focus on the selection sequence rather than the symbol array, which may be static through the selection process.

If multiple award wheels are associated with an award trigger or multiple award triggers are detected at step 116, the selection sequence associated with each award wheel may be presented sequentially, in parallel, and/or with intermediate delays (i.e., the selection sequence of a second award wheel begins prior to the conclusion of the selection sequence of a first award wheel). In certain embodiments, if multiple award wheels are associated with an award trigger and/or multiple award triggers are detected, a subset of the associated award wheels (e.g., one wheel) may be selected from the associated award wheels for the selection sequence such that no selection sequence occurs for the unselected wheels.

In some embodiments, the player may be provided the ability to initiate the selection sequences. That is, the player is prompted to provide input to imitate the award wheel spin. In certain embodiments, the player may additionally or alternatively be provided the ability to manually stop the award wheel via player input. The manual stop may be used to determine the selected award segment (e.g., skill-based segment selection), or the manual stop may be untethered from the underlying selection by the game-logic circuitry.

At step 120, the game-logic circuitry causes the presentation assembly to present an award sequence for the selected award segment. In the example embodiment, the award value indicated by the indicia of the selected award segment is provided through the award sequence. Similar to the selection sequence described above, the award sequence includes one or more output devices (e.g., the presentation assembly, displays, speakers, lighting assemblies, vibration motors, etc.) to engage the player and convey the provided award to the player. In at least some embodiments, the award sequence includes the presentation assembly updated the presented credit balance of the player to include the provided award value.

In some embodiments, the award associated with the selected award segment may include an additional or alternative awards. For example, one type of award may award the award value of one or more other award segments (e.g., an award segment with indicia "ALL" may award the aggregate award values of all other award segments on the award wheel). In another example, the award segment is associated with a progressive jackpot award, which is funded over time though wagers and/or other credit inputs. In yet another example, free spins or free segment selections may be award. The award sequence is adaptable to the particular awards provided, which may include additional graphical elements on the game interface to identify the effect of the award. For example, a text-based message may be presented to describe the award and any changes based on the award.

In some embodiments, the award sequence may include resetting one or more award segments and/or award wheels following the application of the award. In one example, the award value of the selected award segment is removed and replaced with a different award or no award (i.e., a blank segment for receiving new awards in step 114). In another example, the award segment is removed as a whole from the award wheel. In a further example, the award wheel as a whole is reset similar to the initialization of the award wheels in step 106. In other embodiments, the award wheels remain the same following the award sequence. In such embodiments, resetting and/or altering the award wheels may be linked to other game events or conditions, such as a limited number of spins before the award wheels reset.

Similar to step 114, the next game outcome may occur following the award sequence via step 108. Alternatively, a payout sequence may be initiated at step 122 in response to player input and/or insufficient credits remaining in the credit balance to place subsequent wagers. The payout sequence may include terminating the gaming session at the gaming machine (or, for some gaming machines with multiple games or other functions, terminates the current game while leaving the gaming session active). The payout sequence includes providing any remaining credit balance to the player through physical or digital means. That is, bills, coins, tickets, cards, and the like may be generated or altered to represent at least the current credit balance, or the credit balance may be applied to a digital wallet or account associated with the player. The gaming session may then be terminated, thereby enabling other players to initiate a subsequent gaming session at the gaming machine.

FIGS. 4A-4D depict different states of a game interface 200 of a gaming system (e.g., the system shown in FIG. 2) for an example game feature including functionality similar to the game feature associated with the method 100 shown in FIG. 3. The game interface 200 is presented by a presentation assembly of the gaming system in communication with game-logic circuitry. In the example embodiment, the game interface 200 includes a symbol array 202 and a plurality of award wheels 214. In other embodiments, the game interface 200 includes additional, fewer, or alternative game and/or presentation elements, including those described elsewhere herein. For example, in some embodiments, other segmented award elements may be used in place of the award wheels described herein.

Figure 4A:
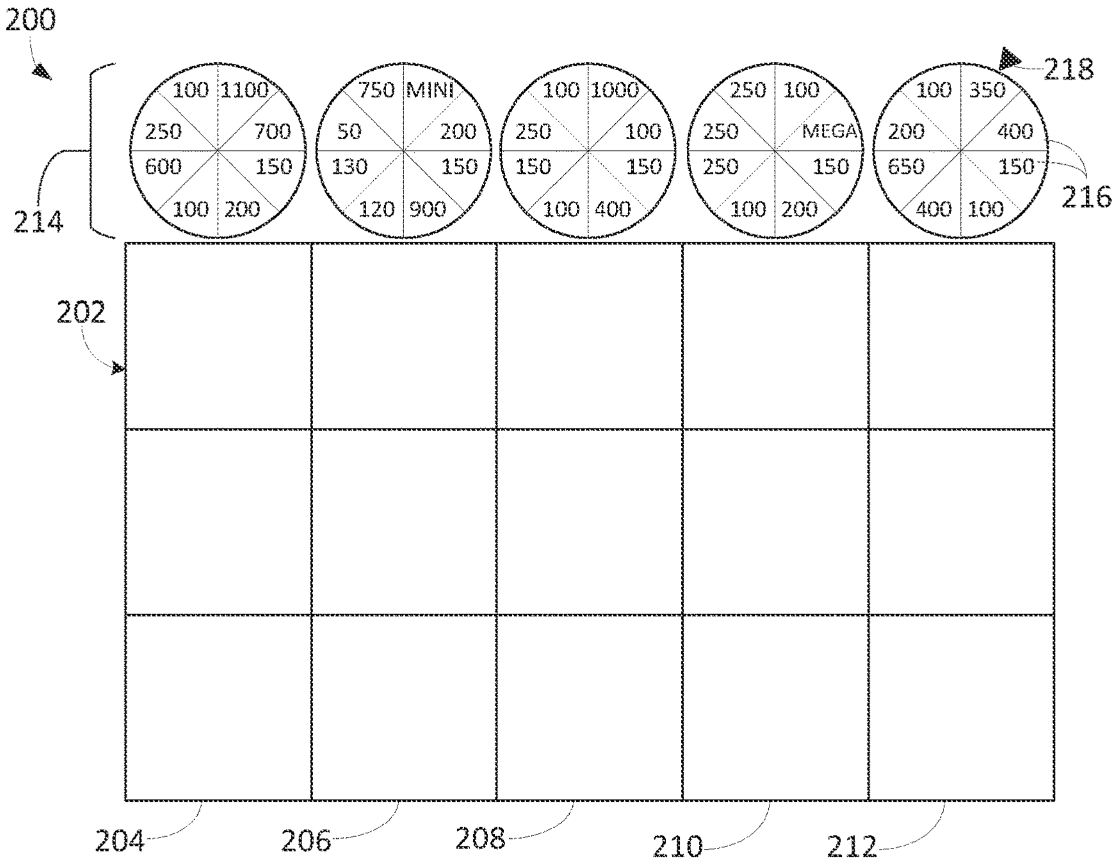
FIG. 4A is a game interface of an exemplary game feature in a first state, according to one or more embodiments of the present invention.

FIG. 4A depicts the game interface 200 in a first, initial state. In the example embodiment, the symbol array 202 includes a plurality of symbol positions arranged into three rows and five columns 204, 206, 208, 210, and 212. The columns 204-212 represent different position subsets or groups of symbol positions for the game feature described herein. In other embodiments, the symbol array 202 includes a different configuration of symbol positions and/or different position subsets are defined (e.g., the position subsets may be rows of symbol positions rather than columns).

For each position subset, the game interface 200 includes a corresponding award wheel 214. The award wheels 214 include a plurality of award segments 216. The award segments 216 may be associated with one or more awards, and the associated awards are visually represented on the game interface 200 by award indicia within the award segment. In the example embodiment, the award values are indicated by text-based indicia. In other embodiments, other indicia may be used, or the indicia for the award remains hidden for at least a portion of the game feature described herein. In addition to the segments 216 with credit values, some of the award segments 216 include jackpot awards indicated by "MEGA" or "MINI" indicia. These indicia reference certain progressive jackpot awards that may be funded through play of the game (and/or other suitable jackpot funding means). It is to be understood that the award indicia in the illustrated embodiments are for exemplary purposes only and are not intended to limit the jackpot awards to the particular indicia shown. Other awards beyond single credit values may also be provided by the award segments 216 as described herein.

In some embodiments, the award wheels 214 may include at least some award segments 216 that have no award indicia, thereby indicating the award segment 216 is not currently associated with an award. In some examples, initiation of the game feature includes initiating the award wheels with some or all award segments 216 having no associated award and therefore no award indicia. As described herein, the award segments 216 are dynamic and can be updated to include new awards through play of the game feature.

In addition to the award segments 216, the award wheels 214 may include a selection indicator 218. The selection indicator 218 is configured to identify one segment 216 of an award wheel 214 at a time for the game feature described herein. In the example embodiment, the selection indicator 218 is an arrow external to the award wheel 214 and pointing toward one of the award segments 216. In other embodiments, other suitable forms of the selection indicator 218 may be used. For example, the selection indicator 218 may be visually integrated with the wheel 214 or a visual modifier rather than a separate game element (e.g., the indicator 218 may be background color applied to one award segment 216 at a time). The selection indicators 218 may be visible throughout play of the game feature or appear in response to triggering the award selection as described herein. For clarity purposes only one selection indicator 218 is shown in FIG. 4A and the indicator 218 is presented again in FIG. 4D for the award segment selection as described in detail below.

Play of the game feature includes selectively populating the symbol array 202 with randomly selected symbols to generate a game cycle outcome or spin. In some embodiments, the symbol positions may be populated with blanks (i.e., no active symbol) such that all, some, or none of the symbol positions are populated by symbols for a given spin. In other embodiments, blanks are not provided, and therefore the entire symbol array 202 is populated for each spin.

The randomly selected symbols may include standard slot-based symbols (i.e., symbols that, through paylines, scatter pays, and/or other winning combination rules, result in awards), special symbols like wilds, and/or value-bearing symbols. For each spin, the game-logic circuitry determines if any winning outcomes are detected and any additional game events from the symbols populating the array 202. Winning outcomes result in an award sequence for at least the corresponding award. In addition to the winning outcomes, the game-logic circuitry determines if any value-bearing symbols occupy the array 202.

Figure 4B:
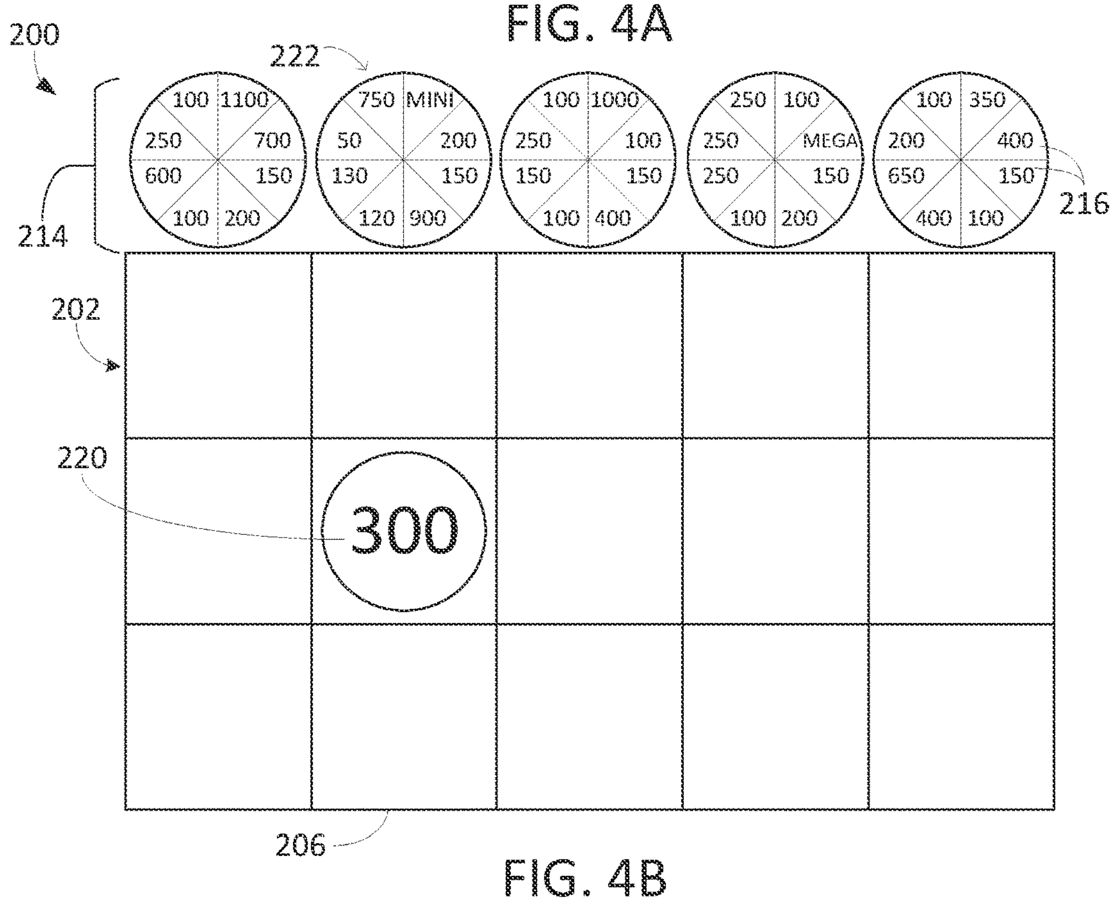
FIG. 4B is the game interface shown in FIG. 4A in a second state with a value-bearing symbol, according to one or more embodiments of the present invention.

FIG. 4B depicts the game interface 200 in a second state. The second state is the outcome of a spin in which a value-bearing symbol 220 occupies the second column 206. The value-bearing symbol 220 includes visual award indicia representing an award value (i.e., 300 credits) associated with the symbol 220. In response to detecting the value-bearing symbol 220, the game-logic circuitry is configured to update award wheel 222 based on the award value of the value-bearing symbol 220. That is, in the example embodiment, the award value of the value-bearing symbol 220 is applied to the award wheel 222 that is associated with the position subset (i.e., the second column 206) occupied by the value-bearing symbol 220. In some embodiments, different types of value-bearing symbols have different applications to the award wheels 214, including the applications described elsewhere herein. In one example, one type of value-bearing symbol applies the associated award value to all award wheels 214. The different types of value-bearing symbols may be indicating through visual distinctions between the symbol types and/or other suitable differences to enable the player to readily identify the impact of a certain value-bearing symbol.

In certain embodiments, in addition to the effect on the award wheels 214 as described herein, the value-bearing symbol 220 may be used to determine winning outcomes with the standard and special symbols occupying the array 202. In one example, the value-bearing symbols 220 function as wild symbols. In another example, the value-bearing symbols function as standard symbols. In these examples, the value-bearing symbols may have the same underlying function as non-value-bearing symbols and therefore can be considered in combination with the non-value-bearing symbols to determining winning outcomes. For example, a cherry symbol with award indicia may function as a value-bearing symbol but also be considered in combination with cherry symbols without award indicia for winning outcomes.

Figure 4C:
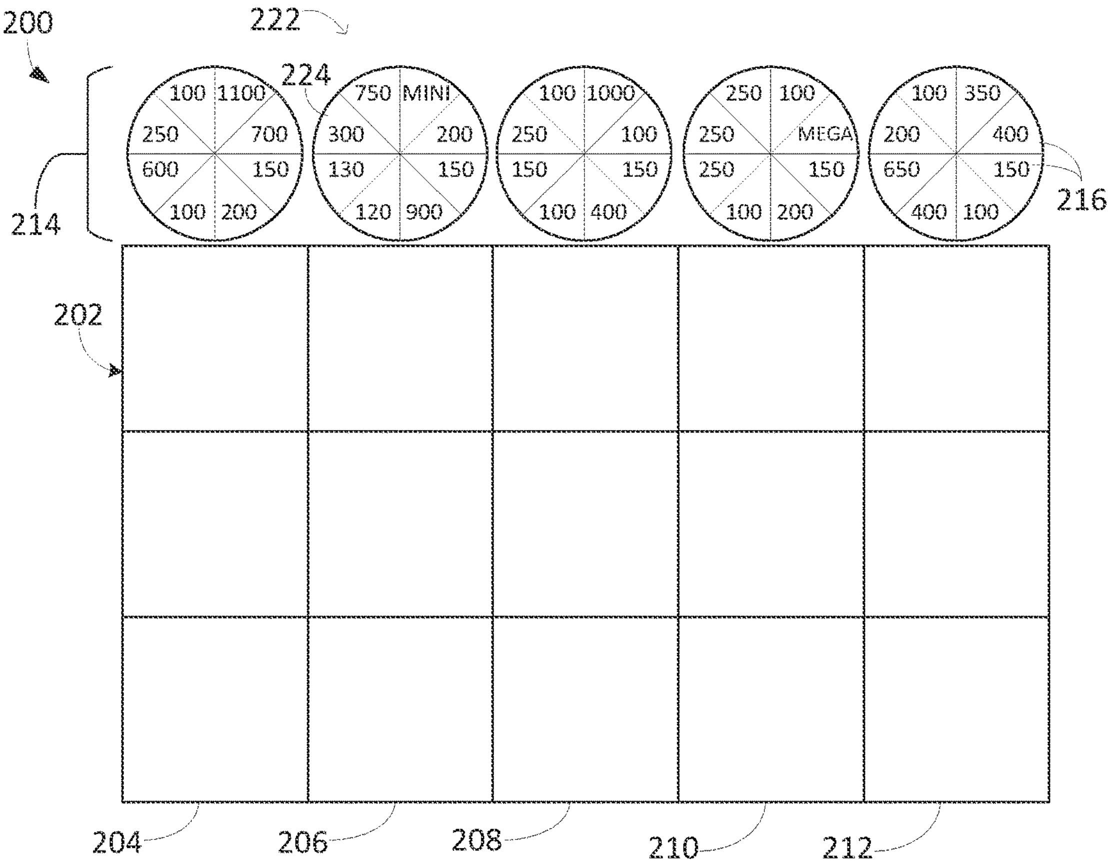
FIG. 4C is the game interface shown in FIG. 4A in a third state with an updated award wheel, according to one or more embodiments of the present invention.

FIG. 4C depicts the game interface 200 in a third state following the second state. In the third state, the award value of the value-bearing symbol 220 is applied to the award wheel 222. More specifically, the award value of the value-bearing symbol replaces or otherwise modifies the preexisting award value (if any) of one or more award segments 216 of the award wheel 222. In the example embodiment, the award segment 224, which previously had an award value of "50," has been updated to include the award value of the value-bearing symbol 220 (i.e., 300 credits). In other embodiments, other modifications of the award segment 224 based on the award value of the value-bearing symbol 220 may be used. For example, rather than replacing the existing value, the award value of value-bearing symbol 220 may be aggregated with the existing value.

The change to the award segment 224 is visually reflected through the updated award indicia and suitable animations or presentation elements linking the value-bearing symbol 220 to the award segment 224. In the example embodiment, the value-bearing symbol 220 is also removed from the array 202 to indicate the relocation of the award value to the award wheel 222. This removal may include one or more animations depicting the award value relocation and the symbol removal. In other embodiments, the award indicia of the value-bearing symbol 220 is removed or the value-bearing symbol 220 remains the same and is removed with the other symbols in the animation for the next spin.

Selection of the award segment 224 may be random and/or based on a set of predefined rules. That is, the rules may limit the number of award segments 216 available for modification and/or define what modification is to be performed. In certain embodiments, all or most award segments 216 may be available for modification, but the predefined rules establish weighting parameters that impact the subsequent random selection of the segments 216. In one example, the blank award segments 216 are modified first or have a relatively higher probability of selection. In another example, selection may be limited to award segments 216 having the same or less award value as the award value of the value-bearing symbol. In a further example, selecting an award segment 216 with a greater award value than the value of the value-bearing symbol may result in an aggregation operation rather than replacing the existing value.

In other embodiments, the award value of the value-bearing symbol 220 is not limited to replacing or modifying the award value of one award segment 216. Rather, multiple award segments 216 may be updated based on the value-bearing symbol 220. In one example, the award value of the value-bearing symbol is added to each award value of the award wheel 222. In another example, the award value of the value-bearing symbol 220 is used to define an award value floor. That is, any award segment 216 with a lower award value is updated with the award value of the value-bearing symbol. In yet another example, the value-bearing symbol 220 may impact award segments 216 of award wheels 214 other than the award wheel 222.

In some embodiments, the award segments 216 have a limited duration defined by one or more game event types. For example, the award segments 216 of one or more award wheels 214 may be configured to reset or change after a predetermined number of game outcomes. Additional or alternative suitable game events (e.g., game outcomes with specific symbols) may be used to define the duration. At the conclusion of the duration, the award segments 216 may be removed from the award wheel or the corresponding award value is changed, such as resetting the award segment 216 to a reset value. In other embodiments, the award segments 216 persist until the end of the game feature, an award sequence, and/or other game events.

Figure 4D:
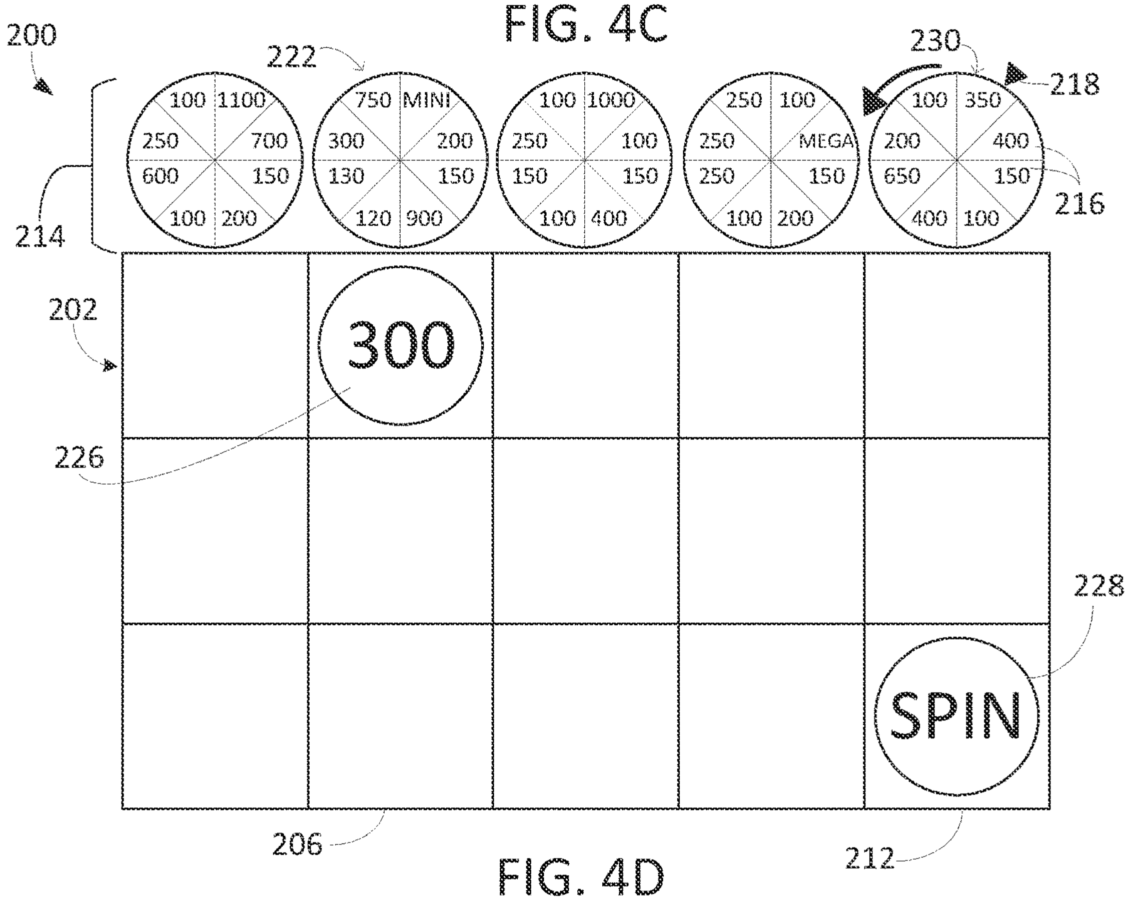
FIG. 4D is the game interface shown in FIG. 4A in a fourth state with a trigger symbol, according to one or more embodiments of the present invention.

FIG. 4D depicts the game interface 200 in a fourth state following the third state. In the fourth state, the symbol array 202 includes an additional value-bearing symbol 226 and a spin trigger symbol 228. More specifically, the value-bearing symbol 226 occupies the second column 206, and the spin trigger symbol 228 is in the fifth column 212. Similar to the value-bearing symbol 220 shown in FIG. 4B, the award value of the value-bearing symbol 226 is applied to one or more award segments 216 of the award wheel 222.

In the example embodiment, the game feature includes award trigger events for each position subset. More specifically, the award trigger event includes the presence of a spin trigger symbol in a position subset. Accordingly, the game-logic circuitry detects an award trigger event for the fifth column 212 in response to the spin trigger symbol 228. In other embodiments, other suitable award trigger events may be used in addition to or in place of the illustrated award trigger event. For example, the award trigger event may include detecting a plurality of trigger symbols within the position subset (within a single game outcome or over a plurality of game outcomes).

In response to the award trigger event, the game-logic circuitry is configured to initiate an award sequence to be presented by the presentation assembly. The award sequence includes selecting one or more awards from the corresponding award wheel (i.e., award wheel 230). In certain embodiments, the number of selections may be determined based on the type of the spin trigger symbol 228 and/or the number of trigger symbols in the position subset. In the example embodiment, one selection is provided irrespective of the number of the trigger symbols.

The selection of an award segment 216 from the award wheel 230 is performed through one or more random determinations (e.g., using the random number generator of the game-logic circuitry). The award segments 216 may have equal probability of being chosen or having varying probabilities through weight parameters applied to the random determinations. In one embodiment, the respective probabilities are weighted based on the relative value of each segment 216, where higher valued segments 216 have a lower probability of selection relative to other award segments 216. In another embodiment, the weighted probabilities are irrespective the values of the award segments.

The selection of an award segment 216 is presented through one or more suitable animations, presentation elements, and the like presented by the presentation assembly. In the example embodiment, a selection indicator 218 is presented for the award wheel 230, and the award wheel 230 is animated to spin and stop in an orientation that aligns the selected award segment 216 with the selection indicator 218 (i.e., if the illustrated state was the conclusion of the spin, then an award of '350' is selected). In other embodiments, the selection indicator 218 is animated to move or spin in addition to or in place of the award wheel 230 spinning. The award value of the selected award segment 216 is then applied to the credit balance of the player as an award through the award sequence. For awards other than credit-based awards, other suitable updates to the game interface 200 may be performed to indicate the selected award has been provided. For example, if free spins or game outcomes have been awarded, the count of free spins may be indicated on the game interface 200 as the game-logic circuitry proceeds to determine the outcomes of the free spins.

In certain embodiments, the award value of the selected award segment 216 is modified prior to being applied to the credit balance. In one example, additional wheels (not shown in FIG. 4D) include segments with modifiers, and selecting a modifier from the additional wheel or wheels causes the award value to be modified at least partially as a function of the selected modifier. In another example, the spin trigger symbol 228 includes a modifier, and the modifier is applied to the selected award value. In a further example, the award value is multiplied by the number of spin trigger symbols within the corresponding position subset.

In some embodiments, the selected award segment 216 includes an award based on the award values of a plurality of award segments 216. In one example, the selected award segment 216 is configured to aggregate the award values of the remaining award segments 216 within the award wheel 230 (including or excluding progressive jackpot awards). In another example, the selected award segment 216 triggers the other award wheels 214 to spin, thereby resulting in an aggregate award based on the selections for each award wheel 214. The effect of such award segments 216 may be visually indicated through the indicia of the award segment 216 (e.g., indicia of "ALL" may result in providing the aggregated award value of the award wheel 230).

Following the award sequence, the award wheel 230 or the selected award segment 216 may be reset. That is, one or more award values are reset to a new award or to a blank award (i.e., zero) to await subsequent selection or replacement via a subsequent value-bearing symbol. In some embodiments, all award wheels 214 reset in response to the award sequence. In other embodiments, the award values do not reset in response to the award sequence such that the selected award segment 216 may be selected again in response to a subsequent award trigger event. In certain embodiments, the award wheel 230 resets in response to a reset condition other than an award sequence, such as expiration of a predetermined number of game outcomes.

Figure 4E:
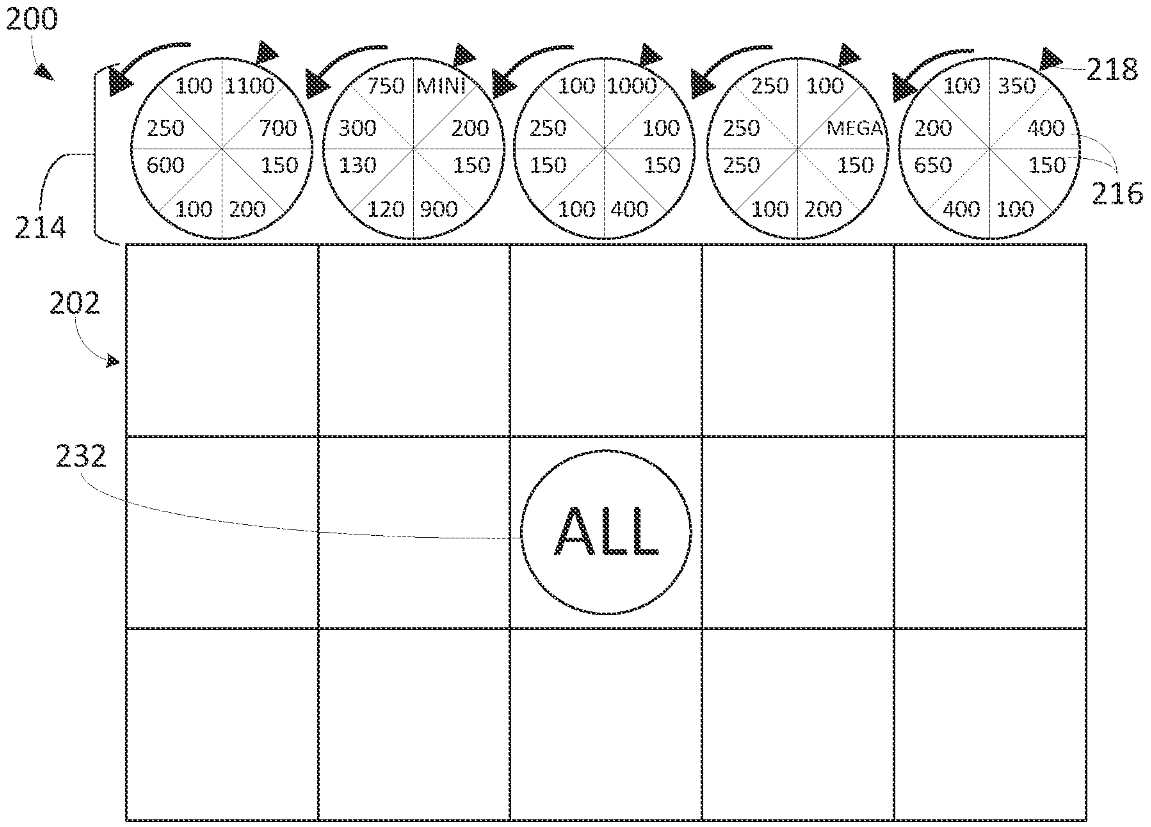
FIG. 4E is the game interface shown in FIG. 4A in a fifth state with an enhanced trigger symbol, according to one or more embodiments of the present invention.

FIG. 4E depicts the game interface 200 in a fifth state following the fourth state. In the fifth state, an enhanced trigger symbol 232 occupies the symbol array 202. The enhanced trigger symbol 232, as indicated by the indicia of "ALL," triggers award sequences for all of the position subsets. That is, the enhanced trigger symbol 232 causes awards to be selected from each of the award wheels 214 irrespective of the position of the symbol 232 within the array 202. The enhanced trigger symbol 232 may be visually distinguished from other trigger symbols (e.g., the trigger symbol 228, shown in FIG. 4D) through the indicia and/or other visual characteristics of the symbol 232.

In some embodiments, other enhanced trigger symbols 232 may trigger award sequences for the occupied position subset and/or at least one additional subset. The additional subset may be determined based on the position of the enhanced trigger symbol 232 within the symbol array 202 or other suitable parameters of the award trigger event. For example, one enhanced trigger symbol 232 may trigger award sequences for the occupied position subset and any adjacent position subsets. In other embodiments, in addition to or in place of triggering multiple award sequences, the enhanced trigger symbols increase or modify the award(s) from the corresponding award sequence. In such embodiments, the change or modification to be applied to the award may be indicated through indicia associated with the enhanced trigger symbol.

In certain embodiments, in addition to or in place of the symbols described above, the symbol positions may be configured to trigger, modify, and/or otherwise change the award wheels 214 as described elsewhere herein. In one example, one or more symbol positions may include an associated modifier, and occupying the symbol position with a trigger symbol causes the modifier to be applied to the award provided through the subsequent award sequence. In another example, the symbol positions are selectively active and inactive in a trigger mode, where the award trigger event includes populating a symbol position in an active trigger mode. If the symbol position occupied by a trigger symbol is inactive, then no award trigger event is detected. Activation and inactivation of symbol positions occurs in response to certain game events or game conditions. In one example, an activation symbol activates symbol positions, where the symbol position returns to an inactive state after a limited duration (e.g., one or more game outcomes). In another example, a subset of symbol positions is randomly (or according to a predetermined sequence or a manual selection by the player) activated for each game outcome.

Figure 5:
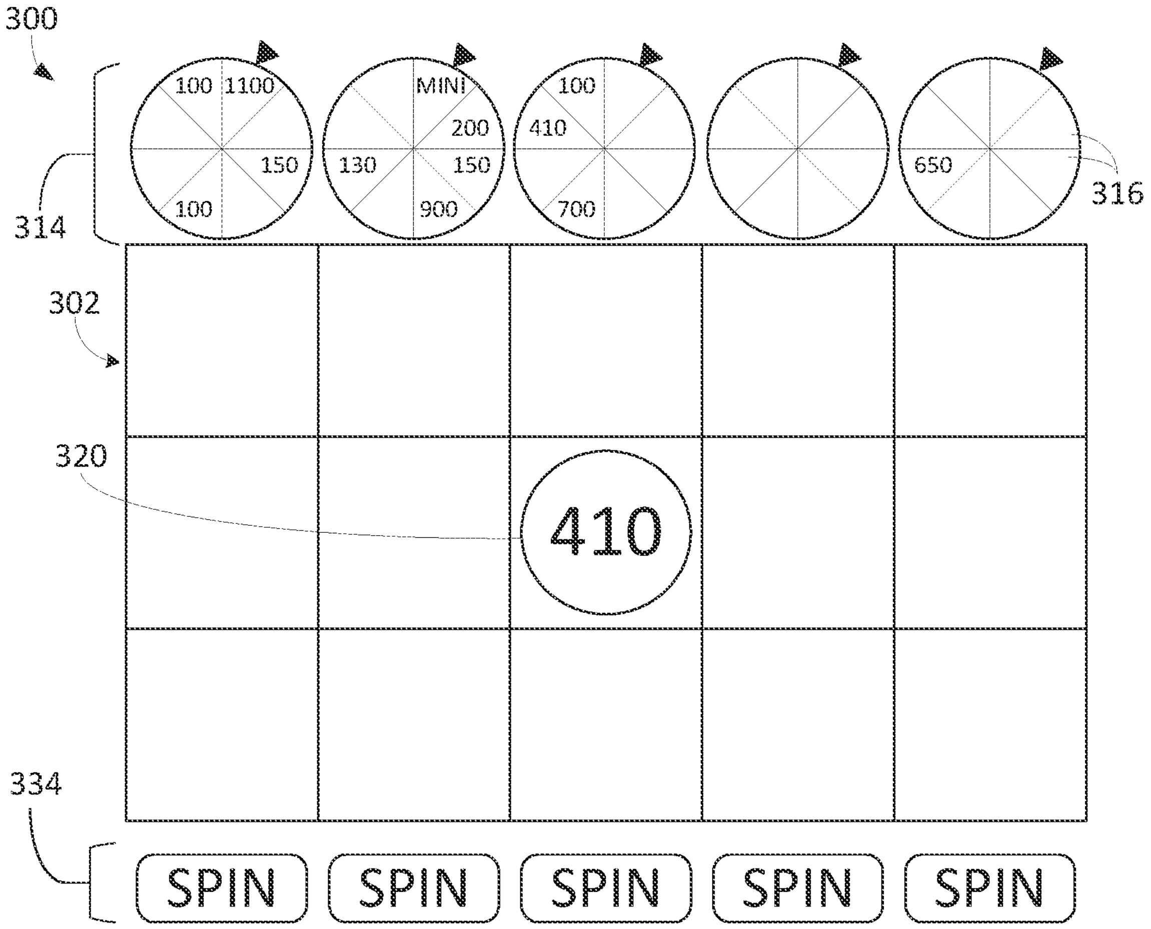
FIG. 5 is a game interface of an exemplary game feature with manual wheel triggers, according to one or more embodiments of the present invention.

FIG. 5 depicts a game interface 300 for a game feature similar to the feature described with respect to FIGS. 3-4E. The game interface 300 is presented by a presentation assembly of a gaming machine. The presentation assembly is in communication with game-logic circuitry (integrated within the gaming machine and/or at least partially separate from the gaming machine). Similar to the game interface 200 (shown in FIGS. 4A-4D), the game interface 300 includes a symbol array 302 and a plurality of award wheels 314, where each award wheel 314 is associated with a respective column of symbol positions (i.e., a position subset). In other embodiments, the game interface 300 includes additional, fewer, or alternative elements and/or animations, including those described elsewhere herein.

In the example embodiment, the award wheels 314 are initialized to include one or more blank award segments 316. That is, the blank award segments 316 do not include a corresponding award value as evidenced by the lack of indicia and/or other visual distinctions. These blank award segments 316 are "filled" (i.e., associated with an award) in response to the detection of value-bearing symbols, such as the value-bearing symbol 320, in the symbol array 302. In at least some embodiments, the blank award segments 316 are prioritized to be updated in response to detecting new value-bearing symbols over award segments 316 that already include awards.

In some embodiments, the award wheels 314 and the awards of the award segments 316 persist until a reset or termination condition is detected. The reset condition may be a predetermined number of game outcomes or other game events concluding and/or detection of an award trigger event. The termination condition may include the conclusion of the game feature. In response to the reset or termination condition, one or more award wheels 314 are reset or initialized to change the awards of the award segments 316, which may include changing one or more segments 316 to blank award segments.

In the example embodiment, additional or alternative award trigger events other than the trigger symbol 228 shown in FIG. 4D are available for the game feature. More specifically, one award trigger event includes filling all of the award segments 316 of a given award wheel 314 (i.e., no blank segments remain). Another award trigger event includes manual initiation of the award sequence. For example, the game interface 300 includes a plurality of spin or trigger inputs 334, where each input 334 is associated with a respective position subset.

The trigger inputs 334 may be configured to receive input from the player (e.g., the game interface 300 is presented via a touchscreen or the game interface 300 includes physical input devices for the inputs 334) to trigger the award event for the corresponding position subset and award wheel 314. In other embodiments, the trigger inputs 334 do not receive player input, but rather act in tandem with other input devices to visually indicate to the player the functionality described herein. It is to be understood that the trigger inputs 334 are not necessarily presented on the same display device or other presentation device are the symbol array 302 and/or the award wheels 314. For example, the trigger inputs 334 may be located at or near an input deck of the gaming machine. Other suitable configurations of the trigger inputs 334 that provide the functionality described herein are considered to be within the spirit and scope of the present disclosure.

In response to detecting the player input at one of the trigger inputs 334, a corresponding award sequence is triggered. While the award sequence is not functionally different from the award sequences described above, the player input enables the player to selectively initiate the award sequence based on the current state of the award wheels 314. The selective award sequence may be used, for example, to attempt to collect certain awards and/or avoid undesirable events or conditions, such as a reset condition for a favorable award wheel 314 configuration. However, in at least some embodiments, the blank award segments 316 may be selected within the award sequence, which may result in no award provided or an alternative award. In certain embodiments, the probability of selecting the blank or filled award segments 316 may be adjusted based on the current state of the award wheel 314.

In some embodiments, for at least player-initiated award sequences, the award sequence may be treated as a reset condition. That is, the corresponding award wheel 314 is reset or otherwise changed following the award sequence. In some embodiments, the player may be provided an allotment of player-initiated award sequences (e.g., through wagering a certain amount, play of the game feature, etc.) such that the state of the award wheel 314 is maintained, thereby increasing the ability of the player to earn awards from the award wheels 314.

In certain embodiments, the trigger inputs 334 do not match that number of position subsets. For example, in embodiments with a single trigger input 334, the trigger input 334 may be used to initiate award sequences for one, some, or all of the position subsets. In such an example, the position subset is randomly selected and/or selected in response to certain game events or conditions. In another example, certain game events (e.g., the enhanced trigger symbol 232, shown in FIG. 4E) may cause the trigger input 334 to initiate award sequences for a plurality of position subsets.

In certain embodiments, instead of or in addition to being associated with a particular position subset, the trigger inputs 334 may be associated with one or more modifiers that modify the award of a selected award segment 316. For example, a '2×' modified trigger input 334 may be selected to be applied to any award provided through the corresponding award sequence. In such embodiments, the selected modifier may modify the underlying probabilities of selection and/or the modifier can only be selected a limited number of times or in certain game conditions.

In the embodiments disclosed herein, each value-bearing symbol may be assigned a credit value that is displayed upon the symbol. The credit value may, for example, range from a minimum credit value to a maximum credit value and be based on the total amount wagered on the game. For example, if a player wagers a minimum of 100 credits, the assigned credit value may range from 100 to 1000 credits. And if a player wagers a maximum of 500 credits, the assigned credit value may proportionately increase and thereby range from 500 to 5000 credits. In some embodiments, the assigned value may be randomly selected from a list of possible multipliers of the total amount wagered on the game, for example, 1×, 2×, 3×, 4×, 5×, 10×, 15×, 20×, 50×, and 100×. In other embodiments, the value may be pre-assigned to each value-bearing symbol as part of the reel strip layouts of the game reels. In still other embodiments, the assigned value may be randomly selected before, during, or at the conclusion of a reel spin.

As disclosed in the embodiments herein, awards may be provided for each game outcome based on at least the remaining symbols. For example, line pays and scatter pays may be awarded for each game cycle outcome based on the symbols populating the symbol array. In some embodiments, the value-bearing symbols may not be associated with awards outside of the features described herein. In other embodiments, the value-bearing symbols may be included within line pays, scatter pays, and/or other suitable awards. For example, the value-bearing symbols may be treated as a special symbol, such as a wild symbol.

While the embodiments are largely described within the context of a base game, it is equally contemplated that the disclosed embodiments can be practiced within the context of a free game bonus without a wager between free game cycles.

The embodiments of the present invention provide an innovative procedure for collecting of symbols in a symbol array on award wheels and selecting an award from the collected values. Game-logic circuitry executing instructions in accordance with the embodiments present a visual presentation of spinning reels with clearly enumerated symbology that are collected in readily understood arrangements to increase the value of the award wheel selection. An observer experiences excitement and anticipation as new symbols land in the array, collected values are presented on updated award wheels, and award values are selected from the award wheel. In stark contrast to conventional reel-spinning games in which symbol images are evaluated for winning combinations by paytable rules, the disclosed embodiments provides immediately recognizable values in WYSIWYG display configurations while adding variability as to how the values to be awarded to the player are selected and accumulated.

The value-collection and value-selection procedure may be symbol- and game-agnostic. Themes and imagery of symbols and environment may be varied with no effect on the value-collection process. Or, if so desired, the criteria for value-collection may be modified in innumerable ways to produce new visual/animation effects and exciting summation sequences.

Further benefits are realized in increased computer processing efficiency, fewer rules to be evaluated, and simpler graphical representations. For example, in a conventional paytable evaluation, overlapping payline sections require multiple evaluation steps. Often, analysis is required to determine which payline results in the highest credit total, with the lesser value paylines being discarded but only after being evaluated-all this adds to processing overhead. Special symbols like wilds, multipliers, and scatter symbols can modify paytable values and may require separate, additional evaluation according to customized rule sets. All these procedures can be inherently more complex than simple collection and selection of number values. The embodiments disclosed herein represents a win-win: simpler, almost self-explanatory graphics combined with faster, more efficient processing. The inventive value-selection procedure can be implemented on the vast majority of casino gaming machines without requiring upgrades or modifications.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming machine comprising:

a presentation assembly configured to present a graphical game interface including a plurality of symbol positions and a plurality of segmented award wheels, the plurality of symbol positions divided between a plurality of position subsets, wherein each wheel of the plurality of segmented award wheels is associated with a respective subset of the plurality of position subsets and includes a plurality of award segments having award indicia that visually indicate corresponding award values, the wheel being positioned within the graphical game interface adjacent to the associated subset; and game-logic circuitry configured to:

cause the presentation assembly to present one or more game outcomes by populating the plurality of symbol positions with randomly selected symbols;

in response to a first subset of the plurality of position subsets being populated by a first value-bearing symbol, cause the presentation assembly to animate one or more award segments of a first segmented award wheel of the plurality of segmented award wheels that is associated with the first subset to be visually updated to incorporate an award value visually indicated by the first value-bearing symbol;

in response to visually updating the one or more award segments, cause the presentation assembly to remove the award value visually indicated by the first value-bearing symbol from the graphical game interface;

in response to the first subset being populated with a threshold number of award trigger symbols, cause the presentation assembly to animate a selection of an award segment of the first segmented award wheel by graphically spinning and stopping at least one of the first segmented award wheel or a selection indicator visually associated with the first segmented award wheel; and cause the presentation assembly to present, via the graphical game interface, an award sequence associated with the award value corresponding to the selected award segment.

2. The gaming machine of claim 1, wherein each wheel of the plurality of segmented award wheels is aligned above the respective subset of the plurality of position subsets, wherein the respective subset is organized in column of a symbol array including the plurality of symbol positions.

3. The gaming machine of claim 1, wherein the award value visually indicated by the first value-bearing symbol replaces initial award values of the one or more award segments of the first segmented award wheel.

4. The gaming machine of claim 1, wherein the plurality of award segments of the first segmented award wheel includes a special award segment, wherein selecting the special award segment causes the presentation assembly to present an award sequence for all award values indicated by the plurality of award segments.

5. The gaming machine of claim 1, wherein the first segmented award wheel includes a blank award segment having no award indicia and no corresponding award value, and wherein the blank award segment is updatable to include an award value in response to one or more value-bearing symbols populating the first subset.

6. A method for conducting and presenting a game using a gaming system, the gaming system including game-logic circuitry and a gaming machine including a presentation assembly, the method comprising:

presenting, by the presentation assembly, a graphical game interface including a plurality of symbol positions and a plurality of segmented award wheels, the plurality of symbol positions divided between a plurality of position subsets, wherein each wheel of the plurality of segmented award wheels is associated with a respective subset of the plurality of position subsets and includes a plurality of award segments having award indicia that visually indicate corresponding award values, the wheel being positioned within the graphical game interface adjacent to the associated subset;

causing, by the game-logic circuitry, the presentation assembly to present one or more game outcomes by populating the plurality of symbol positions with randomly selected symbols;

in response to a first subset of the plurality of position subsets being populated by a first value-bearing symbol, causing, by the game-logic circuitry, the presentation assembly to animate one or more award segments of a first segmented award wheel of the plurality of segmented award wheels that is associated with the first subset to be visually updated to incorporate an award value visually indicated by the first value-bearing symbol;

in response to visually updating the one or more award segments, causing, by the game-logic circuitry, the presentation assembly to remove the award value visually indicated by the first value-bearing symbol from the graphical game interface;

in response to the first subset being populated with a threshold number of award trigger symbols, causing, by the game-logic circuitry, the presentation assembly to animate a selection of an award segment of the first segmented award wheel by graphically spinning and stopping at least one of the first segmented award wheel or a selection indicator visually associated with the first segmented award wheel; and causing, by the game-logic circuitry, the presentation assembly to present, via the graphical game interface, an award sequence associated with the award value corresponding to the selected award segment.

7. The gaming machine of claim 1, wherein the game-logic circuitry is configured to cause the presentation assembly to visually update the one or more award segments to aggregate any preexisting award values with the award value visually indicated by the first value-bearing symbol.

8. The gaming machine of claim 1, wherein the game-logic circuitry is configured to cause the presentation assembly to visually update the one or more award segments to replace any preexisting award values with the award value visually indicated by the first value-bearing symbol.

9. The method of claim 6, wherein each wheel of the plurality of segmented award wheels is aligned above the respective subset of the plurality of position subsets, wherein the respective subset is organized in column of a symbol array including the plurality of symbol positions.

10. The method of claim 6, wherein the award value visually indicated by the first value-bearing symbol replaces initial award values of the one or more award segments of the first segmented award wheel.

11. The method of claim 6, wherein the plurality of award segments of the first segmented award wheel includes a special award segment, wherein selecting the special award segment causes the presentation assembly to present an award sequence for all award values indicated by the plurality of award segments.

12. The method of claim 6, wherein the first segmented award wheel includes a blank award segment having no award indicia and no corresponding award value, and wherein the blank award segment is updatable to include an award value in response to one or more value-bearing symbols populating the first subset.

13. The method of claim 6, wherein animating the one or more award segments includes replacing any preexisting award values with the award value visually indicated by the first value-bearing symbol.

14. The method of claim 6, wherein animating the one or more award segments includes aggregating any preexisting award values with the award value visually indicated by the first value-bearing symbol.

15. A gaming system comprising:

a gaming machine with a presentation assembly configured to present a graphical game interface including a plurality of symbol positions and a plurality of segmented award wheels, the plurality of symbol positions divided between a plurality of position subsets, wherein each wheel of the plurality of segmented award wheels is associated with a respective subset of the plurality of position subsets and includes a plurality of award segments having award indicia that visually indicate corresponding award values, the wheel being positioned within the graphical game interface adjacent to the associated subset; and game-logic circuitry configured to:

cause the presentation assembly to present one or more game outcomes by populating the plurality of symbol positions with randomly selected symbols;

in response to a first subset of the plurality of position subsets being populated by a first value-bearing symbol, cause the presentation assembly to animate one or more award segments of a first segmented award wheel of the plurality of segmented award wheels that is associated with the first subset to be visually updated to incorporate an award value visually indicated by the first value-bearing symbol;

in response to visually updating the one or more award segments, cause the presentation assembly to remove the award value visually indicated by the first value-bearing symbol from the graphical game interface;

in response to the first subset being populated with a threshold number of award trigger symbols, cause the presentation assembly to animate a selection of an award segment of the first segmented award wheel by graphically spinning and stopping at least one of the first segmented award wheel or a selection indicator visually associated with the first segmented award wheel; and cause the presentation assembly to present, via the graphical game interface, an award sequence associated with the award value corresponding to the selected award segment.

16. The gaming system of claim 15, wherein each wheel of the plurality of segmented award wheels is aligned above the respective subset of the plurality of position subsets, wherein the respective subset is organized in column of a symbol array including the plurality of symbol positions.

17. The gaming system of claim 15, wherein the award value visually indicated by the first value-bearing symbol replaces initial award values of the one or more award segments of the first segmented award wheel.

18. The gaming system of claim 15, wherein the plurality of award segments of the first segmented award wheel includes a special award segment, wherein selecting the special award segment causes the presentation assembly to present an award sequence for all award values indicated by the plurality of award segments.

19. The gaming system of claim 15, wherein the first segmented award wheel includes a blank award segment having no award indicia and no corresponding award value, and wherein the blank award segment is updatable to include an award value in response to one or more value-bearing symbols populating the first subset.

20. The gaming system of claim 15, wherein the game-logic circuitry is configured to cause the presentation assembly to visually update the one or more award segments to replace any preexisting award values with the award value visually indicated by the first value-bearing symbol.

21. The gaming system of claim 15, wherein the game-logic circuitry is configured to cause the presentation assembly to visually update the one or more award segments to aggregate any preexisting award values with the award value visually indicated by the first value-bearing symbol.

* * * * *